March 18, 1969      P. A. H. HART      3,434,071

INCOHERENT MICROWAVE GENERATOR INCLUDING A GAS DISCHARGE TUBE

Filed Sept. 14, 1967      Sheet 1 of 2

INVENTOR.
PAUL A.H. HART
BY
Frank R. Trifari
AGENT

United States Patent Office 3,434,071
Patented Mar. 18, 1969

3,434,071
INCOHERENT MICROWAVE GENERATOR INCLUDING A GAS DISCHARGE TUBE
Paul Anton Herman Hart, Emmasingel, Eindhoven, Netherlands, assignor to North American Philips Co. Inc., New York, N.Y., a corporation of Delaware
Filed Sept. 14, 1967, Ser. No. 667,701
Claims priority, application Netherlands, Sept. 16, 1966, 6613076
U.S. Cl. 331—78      8 Claims
Int. Cl. H03b 29/00

ABSTRACT OF THE DISCLOSURE

A device for the production of incoherent microwave radiation in the positive column of a gas discharge. The length of the radiation path in the positive column is increased by providing microwave reflectors so that the path extends through the column more than once.

---

Figure 1:
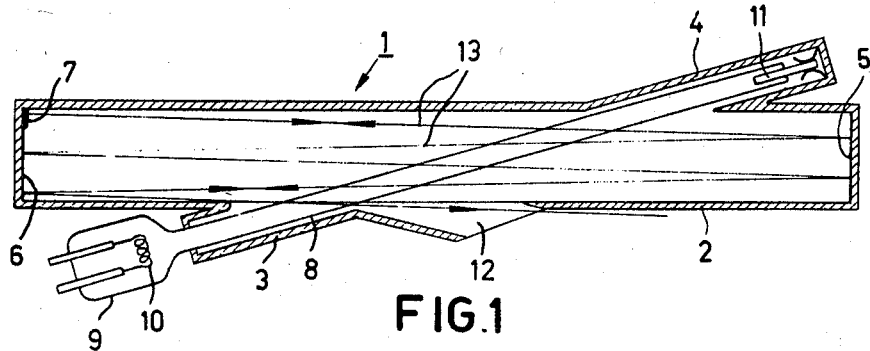

This invention relates to a source of incoherent radiation for microwaves in which the microwave radiation produced in the positive column of a gas discharge is collected in a hollow waveguide.

Such a radiation source may be used, for example, in the spectroscopic investigation of a substance, the absorptive power of the substance then being determined at specific frequencies. As a rule, a plurality of modes of oscillation and preferably a maximum number of modes of oscillation must be available for a radiation source in the relevant wavelength interval. If this were not the case, the energy would be too small for the envisaged purpose. However, if the radiation source is so proportioned that only one mode of oscillations can emerge, then a particular source of radiation is concerned which is usually referred to as "noise generator." A noise generator is used, for example in measuring the noise figure of receivers, for example radar receivers, and also as a standard source of noise in investigations in the field of plasma physics.

The positive column of a gas discharge is highly suitable, since the equivalent radiation temperature is high and external factors, such as the magnitude of the discharge current, the heating voltage and the ambient temperature, usually have little influence on the radiation temperature and the matching. The positive column in the range of microwaves may be considered as a source of radiation having a very high equivalent temperature which closely approximates to the electron temperature of the positive column. The electron temperature is determined substantially by the gas employed, at least in the conditions such as chosen for the column of a radiation source, and is higher as the gas atoms are lighter in weight. Maximum energy is obtained if the positive column serves as a black-body radiator. This is the case if, conversely, the positive column completely absorbs a radiation directed onto it. The path which this radiation must cover in the positive column to be absorbed completely, depends upon the gas employed, but has also been found to be approximately inversely proportional to the square of the wavelength. Thus, for example, in a given case a path between 4 cm. and 10 cm. is needed for a wavelength of 2 mm., a path between 64 cm. and 160 cm. for a wavelength of $500\mu$ and a path between 1600 cm. and 4000 cm. for a wavelength of $100\mu$. It will be evident that the practical realisation thereof gives rise to problems, especially if the wavelength is less than 1 mm.

The present invention mitigates this disadvantage and provides a solution thereof. According to the invention, at least one device which is reflective for the microwave radiation is present in the radiation path. The radiation source is constructed so that the path of the radiation covered in the positive column is increased due to the reflexion or reflexions occurring. For the optimum case, the optical length of path for the desired radiation must be great enough to make the positive column function as a black-body radiator. The cylindrical wall of the wave-guide may be used as the reflecting wall, the aperture of emergence of the radiation source then having to be positioned so that the emerging radiation has been reflected against the wall.

More particularly the positive column of the gas discharge, the axis of which coincides substantially with the longitudinal axis of the waveguide, includes at least one device which is permeable to the gas discharge and reflective for the microwave radiation. In this manner a large range of interaction is obtained. In order to make the radiation source suitable for a large range of wavelengths, two devices are present at a small distance from each other over part of the gas discharge within the wave guide, that is to say located at the side of the cathode of the gas discharge.

Figure 2:
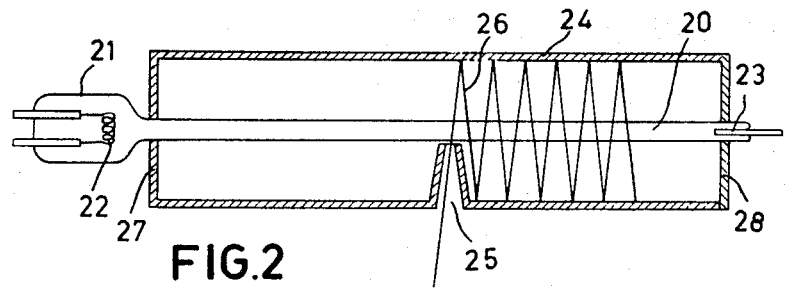
Figure 3:
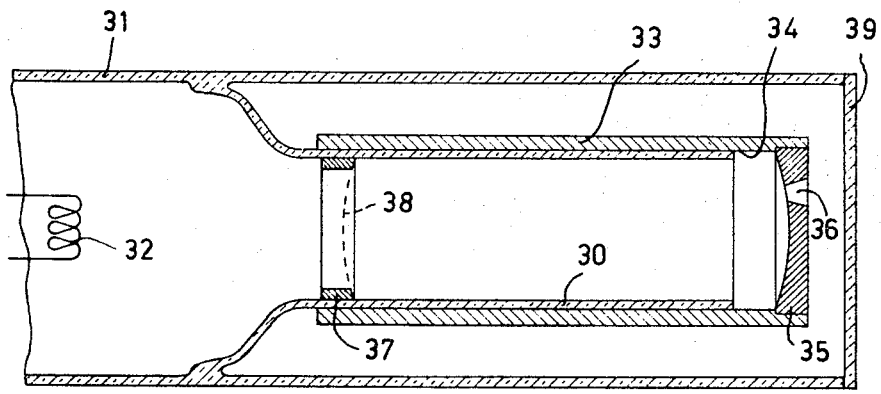
Figure 4:
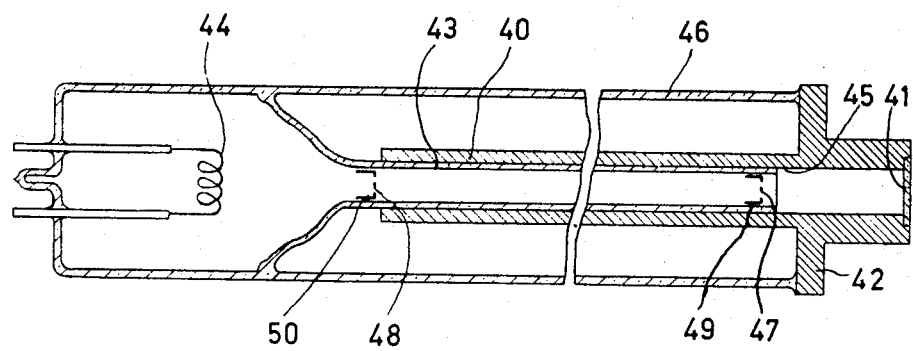
Figure 5:
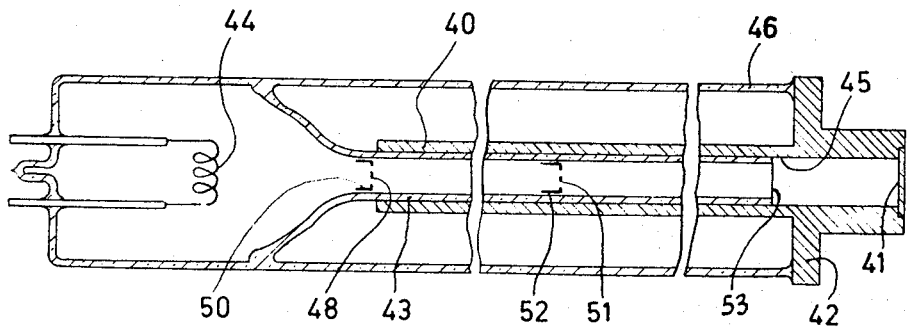

In order that the invention may be readily carried into effect, it will now be described in detail, by way of example, with reference to the accompanying diagrammatic drawings, in which:

FIG. 1 is a cross sectional view of a microwave noise source according to one embodiment of the invention, FIG. 2 is a cross sectional view of a microwave noise source according to another embodiment of the invention, FIG. 3 is a cross sectional view of a portion of microwave noise source according to another embodiment of the invention, FIG. 4 is a cross sectional view of still another microwave noise source according to the invention, and FIG. 5 is a cross sectional view of a further microwave noise source according to the invention.

FIGURE 1 shows a copper wave guide 1 having a central portion 2 and lateral portions 3 and 4. The rectangular central portion 2 is closed at both sides by reflective metal layers 5 and 6 which are at right angles to the axis of the central portion. A small portion of the reflective layer 6 is furthermore covered with a reflective layer 7 which is at a small angle to the layer 6. A thin-walled tube 8 of quartz has been introduced into the lateral portions 3 and 4 which are in alignment with each other. The thin-walled tube 8 merges into a wider portion 9 which surrounds an oxide cathode 10 of a gas discharge tube, an anode 11 of the gas discharge tube being present at the other end of tube 8. The wave guide has a window 12 through which the radiation produced in the positive column of the gas discharge emerges. A radiation path 13, which passes the gas discharge nine times, is shown for the radiation parallel to the direction at right angles to the reflective layer 7.

FIGURE 2 shows a thin-walled tube 20 of quartz, which merges into a wider portion 21 which surrounds an oxide cathode 22 of the gas discharge tube, an anode 23 of the gas discharge tube being present at the other end of the tube 20 which is inserted into a metallic cylinder 24 having an inner reflective surface. The cylinder is closed by walls 27 and 28 each provided with an aperture. The wall of the cylinder has an aperture 25 for collecting the radiation produced. When radiation is collected at an angle which differs from the right angle to the axis of the cylinder, this radiation has passed the gas discharge a pluarality of times. The smaller the angle to the direction at right angles to the axis of the cylinder, the more times the radiation has passed the gas discharge and the more closely an idealised black-body radiation is approximated. The figure shows a radiation path 26 for a given direction. The effect is even increased if the inner surfaces of the walls 27 and 28 are also reflective.

FIGURE 3 shows a thin-walled tube 30 of quartz which merges into an outer glass tube 31 which surrounds an oxide cathode 32 of the gas discharge tube. The tube 30 is surrounded by a reflective metallic tube 33. The function of an anode is fulfilled by the inner side of tube 33, at 34, immediately beyond the end of the quartz tube 30. To this end, a lead-through which is not shown in this section, is provided in the glass tube 31. One end of the tube 33 is closed by a concave metallic mirror 35 having an aperture 36 to allow passage of the radiation produced. At the other end of tube 33 and inside the tube 30 is a metallic ring 37 on which a gauze 38 is fitted which fulfills the function of a concave mirror for the radiation. The optical axes of the concave mirrors coincide with the axis of tube 33. At the side of the aperture of emergence 36, the glass tube 31 is closed by a quartz window 39. Since the radiation path in this case is comparatively complicated, it is not shown. This path follows the periphery of a kind of a cone of revolution. If the two mirrors belong to a confocal system, three deflections occur against the concave mirrors and the radiation passes the positive column at least 4 times, depending upon the number of reflexions on the tube 33. By way of example, it is mentioned that the total radiation path must be approximately 100 cm. for a radiation source having a wavelength of 500μ. When using a confocal system, this can be realized with a discharge of approximately 35 cm. and mirrors having a focal length of approximately 15 cm. In a determined case, the diameter of the mirrors was 18 mm.

In FIGURE 4 a circular copper wave guide 40 is closed at one end by a mica window 41 and locally provided with a flange 42 for coupling with a wave guide, not shown. A thin-walled tube 43 of quartz extends into the wave guide 40 and merges into a glass tube 46 which surrounds an oxide cathode 44 of the gas discharge tube. The function of an anode is fulfilled by the inner side of the wave guide, at 45, immediately beyond the end of the quartz tube. The tube 46 is sealed to the flange 42. Insulated gauzes 47 and 48, fitted on sleeves 49 and 50 respectively, are present substantially at the end of the quartz tube and at the end of the wave guide. The positive column is present in the quartz tube and the gas discharge passes the gauzes unhindered. The gauze 48, which is located at the side of the cathode, is so proportioned that substantially complete reflexion locally occurs for each wavelength in the desired range of radiations. The gauze 47 allows passage of the radiation to a slight extent. The portion of the wave guide between the gauzes 47 and 48 thus constitutes a kind of a resonator; the radiation passes to and fro a plurality of times between the gauzes 47 and 48. Assuming that the dissipative losses in the gauzes and the wave guide are small, it can be proved, on the one hand, that for resonance it is necessary to fulfill the condition $\beta 1 + \gamma = 0$, where $\beta$ is the phase constant of the wave, 1 is twice the distance between the gauzes 47 and 48, and $\gamma$ is the phase shift which a wave undergoes when passing through the gauze 47. If the distance between the gauzes is equal to a large number of times the wavelength, the condition for resonance can be fulfilled over a range of wavelengths by varying the discharge current in the order of percent. The radiation source can thus be electrically adjusted. On the other hand, it can be shown that, in order to be a black-body radiation of this wavelength, it is necessary to fulfill the condition $\rho = e^{-\alpha 1}$, wherein $\rho$ is the modulus of the reflexion coefficient of the gauze 47 and $\alpha$ is the damping constant of a collected wave of this wavelength. To fulfill this condition, allowance must be made for the fact that the damping constant $\alpha$ is proportional to the square of the wavelength $\lambda$ so that the modulus $\rho$ of the coefficient of reflexion must depend upon the wavelength $\lambda$ in a determined way. This may be achieved in different ways.

If the radiation source must provide radiation which is linearly polarised, the gauze 47 is replaced by a grating having a pitch which is less than approximately one-third of wavelength. If the radiation has a wavelength of 50μ or more, this may be achieved with a pitch of 10μ at a thickness of wire of 5μ or less. By rotating the grating relative to the direction of polarisation it is possible to adjust any desired value for $\rho$, which is effected by rotating the whole of the tube.

If the radiation must not be polarised linearly, the gauze 47 could be replaced by two separate gauzes which can be shifted relative to each other. If the shift is in the axial direction, the modulus of the coefficient of reflexion must be approximately equal to unity for each gauze, the gauzes then constituting a transforming resonator. If the shift is in the transverse direction, the modulus of the coefficient of reflexion must not be great, the gauzes in this case covering each other's apertures due to the shifting movement.

Another embodiment of an adjustable radiation source which is not linearly polarised is shown in FIGURE 5. Apart from the position of the gauze located at the side of the mica window, the structure is identical with that of FIGURE 4 and the same reference numerals have therefore been used. A gauze 51 which is located at the side of the mica window and fitted on a sleeve 52, finds itself at a small distance from the end 53 of the quartz tube 43. The reflexion of the gauze 51 is chosen to be equal to or slightly less than that which corresponds to the shortest wavelength and the associated damping of a collected wave. The gas discharge between the gauze 51 and the end 53 then compensates wholly or in part for an excessive value of the modulus of the reflexion coefficient for comparatively long wavelengths, since the damping along this portion is $e^{-\alpha 1}$, where 1 is in this case twice the distance between the gauze 51 and the end 53. If the distance between the gauzes 48 and 51 is equal to a large number of times the wavelength, the condition for resonance over a range of wavelengths can again be fulfilled by varying the discharge current in the order of percent. Since the portion between the gauzes 48 and 51 provides a contribution for shorter wavelengths and the portion between the gauze 51 and the end 53 provides a contribution for longer wavelengths, this radiation source is suitable for a large range of wavelengths.

What is claimed is:

1. A device for producing incoherent microwave radiation comprising means for producing a positive column of gas discharge in a given region, and microwave reflective means positioned to form a microwave path that passes through said region a plurality of times, said means for producing said positive column comprising a tube of insulating material having an enlarged closed end connected to a portion of relatively smaller diameter with an open end, a cathode within said enlarged end, and an anode comprised of a metallic tube surrounding said portion and extending beyond said open end, and said reflective means comprising first mirror means in said portion adjacent said enlarged end, and second mirror means positioned along the axis of said portion and further from said cathode than said first mirror means, said first mirror means having at least one aperture to permit passage of said gas discharge, said second mirror means having at least one aperture for collecting radiation.

2. The device of claim 1 in which said first mirror means comprises a microwave reflecting gauze positioned coaxially in said portion, and said second mirror means is a concave metallic mirror connected to said anode.

3. The device of claim 1 in which said first and second mirror means are comprised of insulated gauze and are positioned within said portion.

4. A source of incoherent microwave radiation comprising means for producing a positive column of a gas discharge in a given region, whereby microwave noise radiation is produced in said positive column, a pair of microwave reflectors positioned to reflect said radiation a plurality of times through said region to thereby increase the path of said reflected radiation in said positive column, and an outlet port positioned substantially in alignment with one of said reflectors to collect said reflected radiation directly therefrom.

5. The source of claim 4 wherein said reflectors are positioned to reflect said radiation in a path through said positive column for a distance whereby the optical length of said path is sufficient that said positive column functions as a black-body radiator.

6. The source of claim 4 comprising a rectangular conductive waveguide section, wherein said means for producing said positive column comprises an elongated envelope of a material transparent to microwaves and having a cathode at one end and an anode at another end thereof, said envelope extending through opposite walls of said waveguide section at an angle to the axis of said waveguide section, whereby said positive column is within said waveguide section, wherein said microwave reflectors comprise microwave reflective end walls on said waveguide section, and wherein said outlet port comprises an aperture in a side wall of said waveguide section positioned to receive radiation reflected directly from one of said end walls.

7. The source of claim 6 wherein said end walls extend at right angles to the axis of said waveguide section, comprising a microwave reflective member on one of said end walls that is small with respect to said one end wall and positioned at an angle to the plane of said one end wall.

8. The source of claim 4 wherein said means for producing said positive column comprises an elongated envelope of a material transparent to microwaves and having a cathode at one end and an anode at another end thereof, wherein said pair of microwave reflectors comprise opposite side walls of a rectangular waveguide section positioned coaxial with and surrounding a portion of said envelope whereby said positive column is produced within said waveguide section, said waveguide section having end walls through which said envelope extends, and wherein said outlet port comprises an aperture in one of said opposite walls positioned to collect radiation reflected from the other of said opposite walls.

References Cited

UNITED STATES PATENTS

| 2,706,782 | 4/1955 | Mumford | 331—78 |
| 2,716,192 | 8/1955 | Johnson | 331—78 |
| 3,222,614 | 12/1965 | Hart et al. | 331—78 |

ROY LAKE, *Primary Examiner.*

SIEGFRIED H. GRIMM, *Assistant Examiner.*

U.S. Cl. X.R.

315—39; 331—97, 126